United States Patent Office 3,101,266
Patented Aug. 20, 1963

3,101,266
DEALLERGENIZATION AND DETOXIFICATION
OF CASTOR BEAN POMACE
Joseph R. Spies, Arlington, Va., Emery J. Coulson, Takoma Park, Md., and Percy A. Wells, Abington, Pa., assignors to the United States of America as represented by the Secretary of Agriculture
No Drawing. Filed Sept. 13, 1960, Ser. No. 55,809
7 Claims. (Cl. 71—23)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the United States of America.

This invention relates to the deallergenization and detoxification of castor bean pomace.

Castor beans contain two principal harmful components: ricin, an extremely poisonous albumin, and an exceptionally stable allergenic component. In processing the castor bean for castor oil these components are retained in the pomace, the ground, defatted bean residue. The toxicity of ricin is known to be destroyed when heated in water to the boiling point or even to the coagulation temperature of the protein. Despite intensive efforts to inactivate the allergen, the presence of this factor in castor bean pomace is still a serious problem in handling castor bean pomace or products into which the pomace is incorporated. This is because the allergen has unusually potent sensitizing capacity for those exposed to the dust of castor bean pomace. Even trace amounts provoke severe asthma in hypersensitive individuals. Although processes have been proposed for deactivating the allergen, none of these currently reported suffice to yield a product which can be safely handled by all people.

An object of the present invention is to render castor bean pomace nonallergenic and nontoxic. A further object is to provide a castor bean product having both organic and inorganic nutritive values as a fertilizer. Still another object is to provide a fertilizer containing castor bean pomace which can be used without endangering the health of handlers and consumers.

According to the present invention, castor bean pomace, water and calcium hydroxide are combined to give a mixture having a pH in the range of about 9.5 to 12.5, and the alkaline mixture is heated at about 100 to 120° C. for a time interval of about eight to sixty minutes. This treatment inactivates the allergen and destroys the toxic components. The pomace product is used as an alkaline fertilizer, or preferably the reaction mixture is partially or completely neutralized to give a pomace-calcium phosphate solid, a new combination fertilizer.

Various alternatives are available for handling the products as fertilizers. For local use, the wet slurry may be directly applied to fields, or solids may be collected from the slurry by conventional means, such as centrifuging or filtering, and the product used as a wet sludge. In practice, it is anticipated that a considerable portion or all of the slurry or the collected pomace product will be dried, thus facilitating storage, shipping and consumer use.

The particular means of combining the pomace, water and calcium hydroxide to achieve the desired pH is immaterial to the invention. A convenient procedure is to combine calcium hydroxide and pomace on a percentage basis; for example, eight percent calcium hydroxide, dry weight basis, and add calculated amounts of water. Alternatively, a freshly prepared aqueous suspension of calcium hydroxide of known concentration can be combined with dry pomace or with an aqueous slurry of pomace.

In preparing the pomace-calcium phosphate fertilizer, the addition of one mole of phosphoric acid for each mole of calcium hydroxide combined with the pomace gives a product with a pH in the range of 5.5 to 6.5. A neutral (pH 7.0) or slightly alkaline fertilizer may be produced, if desired, by adding less phosphoric acid to the alkaline pomace mixture. For convenience and safety, we allowed the heated mixture to cool before adding the phosphoric acid, but this is not a requirement of the process.

It has previously been established that the toxic and allergenic principles are water soluble, although it is not feasible to remove all the allergen from the pomace by water leaching. Accordingly, for purposes of accuracy and of controlled analysis, destruction of the toxic and allergenic components in the pomace by the inventive process was determined by tests made on the aqueous solution separated from treated and control pomace slurries.

In many instances the inventive process is more conveniently demonstrated by application to isolated castor bean allergen. The isolation of castor bean allergen was described in J. Am. Chem. Soc., 65, 1720 (1943), the fraction being called CB–1A. Dialysis of CB–1A with successive changes of water gives a further purified castor bean allergen, (CB–1A)E, which is nontoxic and is not coagulated at temperature up to 170° C., either at neutrality or at pH values above 12. The use of (CB–1A)E rather than pomace in tests on humans eliminates the possibility of toxic effects.

Toxicity was determined by subcutaneous injection in guinea pigs of one ml. of treated or untreated pomace solution. Twofold serial dilutions were injected through a maximum dosage of extract from 12.8 mg. of castor bean pomace. The average lethal dose of untreated pomace was 0.1 mg. per $300\pm20$ g. guinea pig, the range being from 0.05 to 0.2 mg. Results of toxicity tests are described (cf. Table I) as follows: NS, no symptoms with the quantity of pomace indicated in mgs.; I, induration at the site of injection, but no deaths or necrosis; and N, no deaths with 12.8 mgs. of pomace, but necrosis at the site of injection with indicated quantity of pomace and no symptoms with smaller amounts.

Precipitin tests employed clarified rabbit antiserum obtained from rabbits immunized to the principal antigen of (CB–1A)E. Fifteen-hundredths milliliter of clarified antiserum in a 5 x 45 mm. tube was mixed with 0.15 ml. of test solution and incubated 30 minutes at 37° C. The tubes were placed at 5° C. and the preciptate read visually after 24 hours. Dilutions were made with a buffered saline solution, pH 7.0. Treated pomace and (CB–1A)E solutions were tested at $1:10^4$ dilution with respect to their original (CB–1A)E content to determine destruction of preciptating capacity. Absence of a precipitate with this test shows destruction of at least 98 percent of the precipitating capacity.

The Prausnitz-Kustner or passive transfer test on humans was used to evaluate loss of allergenic properties of the castor bean extracts. Essentially, the same method was used as described in Annals of Allergy, 18, 393 (1960). The recipients were free from antihistamine medication. A zero allergenic property was recorded only when the test showed that 99.95 percent of the allergen had been destroyed. Determination of this degree of completeness of destruction of the allergen was necessary because of the extremely small amount of castor bean allergen capable of provoking an asthmatic attack in a hypersensitive person.

The castor bean pomace for the examples was prepared from castor beans by decortification, defatting with ether, and grinding to pass a 40-mesh sieve.

Our invention is illustrated but not limited by the following examples:

EXAMPLE 1

To 78 mg. samples of defatted, powdered castor bean pomace were added calculated amounts of water and an aqueous calcium hydroxide suspension to give a total volume of 3.0 ml. and percentages of calcium hydroxide, based on pomace, of 0, 1, 2, 4, 8, and 16. The ingredients were mixed and heated in closed tubes for one hour at temperatures of 60°, 80° and 100° C. The mixtures were cooled to room temperature and then calculated amounts of water and 0.1 M o-phosphoric acid were added (one mole of phosphoric acid for each mole of calcium hydroxide) so that the total volume of the slurry was 6.0 ml. The pH of the neutralized slurry was in the range of 5.5 to 6.5. After standing several minutes, each slurry was centrifuged and the supernatant solution separated from the pomace-calcium phosphate solids. Each supernatant solution was tested as previously described. Heating at 60° C. was not sufficient to destroy toxicity at most levels of pH and results at this temperature are omitted from the summary presented in Table I.

The combination of heating a solution of pH 11.8 for one hour at 100° C. deactivated both the antigenic and allergenic properties of the castor bean allergen. Lowering the temperature to 80° C., same pH and time, destroys only the antigenic property. Elimination of ricin toxicity was confirmed. The induration at the injection site by the maximum dosage was caused, in part at least, by the calcium phosphate, as indicated in the 100° test where concentrations of calcium hydroxide through 0.007 M caused no induration with 12.8 mg. of pomace, but higher concentrations of calcium hydroxide gave test solutions which caused induration. An ulcer-producing factor found in the pomace was also inactivated by conditions which deactivate the allergen.

To further substantiate the results of deallergenization of the pomace, the isolated, nontoxic allergen of castor beans, (CB-1A)E, was treated similarly to the pomace as in Example 1.

Table I
EFFECT OF HEATING CASTOR BEAN POMACE WITH AQUEOUS CALCIUM HYDROXIDE ON ALLERGEN AND TOXIC COMPONENTS

| Ca(OH)$_2$ | | Temperature [a] | | | | | | | |
|---|---|---|---|---|---|---|---|---|---|
| | | 80° | | | | 100° | | | |
| M [b] | Percent [c] | pH [d] | Precipitin [e] | Allergenic property [f] | Toxicity [g] | pH [d] | Precipitin [e] | Allergenic property [f] | Toxicity [g] |
| 0 | 0 | 6.2 | 4+ | + | 0.8 N | 6.4 | 4+ | + | 12.8 NS |
| 0.0035 | 1 | 7.7 | 4+ | + | 12.8 I | 7.5 | 4+ | + | 12.8 NS |
| 0.007 | 2 | 9.5 | 3+ | + | 12.8 I | 9.0 | 1+ | + | 12.8 NS |
| 0.014 | 4 | 10.4 | 1+ | + | 12.8 I | 10.3 | 1+ | + | 12.8 I |
| 0.028 | 8 | 11.8 | 0 | + | 12.8 I | 11.8 | 0 | 0 | 12.8 I |
| 0.056 | 16 | 12.5 | 0 | + | 12.8 I | 12.3 | 0 | 0 | 12.8 I |

[a] Heated one hour at indicated temperature, centigrade.
[b] Molarity.
[c] Percent calcium hydroxide based on weight of pomace.
[d] pH of suspension after heating and cooling.
[e] Antigenic or immune precipitating property of castor bean allergen.
[f] As determined on (CB-1A)E under corresponding conditions.
[g] Described in text.

EXAMPLE 2

Thirty mg. samples of (CB-1A)E were dissolved in the calculated volumes of water and a freshly prepared aqueous suspension of calcium hydroxide (100 or 10 mg./ml.) was added to give a total volume of 3.0 ml. and molar concentrations of calcium hydroxide of 0, 0.0035, 0.007, 0.014, 0.028 and 0.056. The solutions or suspensions were heated in sealed tubes at 80, 100 and 120° C., cooled and the pH determined. Excess calcium hydroxide was neutralized with 0.1 M o-phosphoric acid, mole for mole, and the final volume was adjusted to 6.0 ml. with water. The pH of resulting solutions or suspensions was 6±0.5. After occasional shaking for several minutes, the precipitate of calcium acid phosphate, if any, was separated by centrifuging. The clear solutions or their dilutions were used for precipitin and allergen tests. Results are summarized in Table II.

Table II
EFFECT OF HEATING CASTOR BEAN ALLERGEN (CB-1A)E, WITH AQUEOUS CALCIUM HYDROXIDE ON ITS IMMUNE PRECIPITATING CAPACITY AND ON AN ALLERGENIC PROPERTY (REAGIN NEUTRALIZATION)

| Ca(OH)$_2$, M [b] | Temperature [a] | | | | | | | | |
|---|---|---|---|---|---|---|---|---|---|
| | 80° | | | 100° | | | 120° | | |
| | pH [c] | Precipitin [d] | Allergenic property [e] | pH [c] | Precipitin [d] | Allergenic property [e] | pH [c] | Precipitin [d] | Allergenic property [e] |
| 0 | 6.2 | 4+ | + | 6.2 | 4+ | + | 6.0 | 2+ | + |
| 0.0035 | 9.8 | 1+ | + | 9.3 | 1+ | + | 8.7 | 1+ | 0 |
| 0.007 | 11.0 | 1+ | + | 10.8 | 0 | + | 9.8 | 0 | 0 |
| 0.014 | 11.9 | 0 | + | 11.4 | 0 | + | 10.6 | 0 | 0 |
| 0.028 | 12.4 | 0 | + | 12.0 | 0 | 0 | 12.1 | 0 | 0 |
| 0.056 | 12.5 | 0 | + | 12.4 | 0 | 0 | 12.7 | 0 | 0 |

[a] Heated one hour at indicated temperature, ° C.
[b] Molarity.
[c] pH of solution or suspension after heating and cooling, before addition of phosphoric acid.
[d] Precipitin reaction with 1:10$^4$ dilution of (CB-1A)E.
[e] 0, indicates destruction of 99.95% or more reagin neutralization capacity of (CB-1A)E; +, indicates less than 99.95% destruction of reagin neutralization capacity of (CB-1A)E.

As shown in Table II, at 80° C. for one hour, the antigenic property (immune precipitating capacity) of the castor bean allergen was destroyed at pH 11.9, but the allergenic property (reagin neutralizing property) was not destroyed even at pH 12.5. At 100 and 120° C., the precipitating capacity was destroyed at pH values of 10.8 and 9.8 and the reagin neutralizing property at pH values of 12.0 and 8.7, respectively. The combinations of either pH about 12 and 100° C. or pH about 9.5 and 120° C. for one hour suffice to destroy both properties of the castor bean allergen.

EXAMPLE 3

This example varied from Example 2 in that all samples were prepared with 8 percent (0.028 M) calcium hydroxide and that the tubes were heated at 100 and 120° C. for periods of time ranging from zero (control) to 64 minutes. The rates of destruction of antigenic and allergenic properties are shown in Table III.

These results show that at pH about 12.5 the castor bean allergen is deactivated in about 30 minutes at 100° C. and in eight minutes or less at 120° C.

Table III

EFFECT OF TIME OF HEATING CASTOR BEAN ALLERGEN (CB-1A)E, WITH 0.028 MOLAR AQUEOUS CALCIUM HYDROXIDE ON ITS IMMUNE PRECIPITATING CAPACITY AND ON AN ALLERGENIC PROPERTY (REAGIN NEUTRALIZATION)

| Time, minutes | Temperature | | | | | |
|---|---|---|---|---|---|---|
| | 100° | | | 120° | | |
| | pH [a] | Precipitin [b] | Allergenic property [c] | pH [a] | Precipitin [b] | Allergenic property [c] |
| 0 | 12.6 | 4+ | ------ | 12.6 | 4+ | ------ |
| 1 | 12.5 | 1+ | + | ---- | ------- | ------ |
| 2 | 12.5 | 1+ | + | 12.4 | ± | + |
| 4 | 12.6 | 0 | + | 12.3 | 0 | + |
| 8 | 12.5 | 0 | + | 12.2 | 0 | 0 |
| 16 | 12.5 | 0 | + | 12.1 | 0 | 0 |
| 32 | 12.4 | 0 | 0 | 12.0 | 0 | 0 |
| 64 | 12.3 | 0 | 0 | 11.6 | 0 | 0 |

[a] pH of solution or suspension after heating and cooling, before addition of phosphoric acid.
[b] Precipitin reaction with 1:10⁴ dilution of (CB-1A)E.
[c] 0, indicates destruction of 99.95% or more reagin neutralization capacity of (CB-1A)E; +, ind